Aug. 27, 1935.  L. BACQUEYRISSE  2,012,369
RESILIENT WHEEL FOR RAIL VEHICLES
Filed March 26, 1932
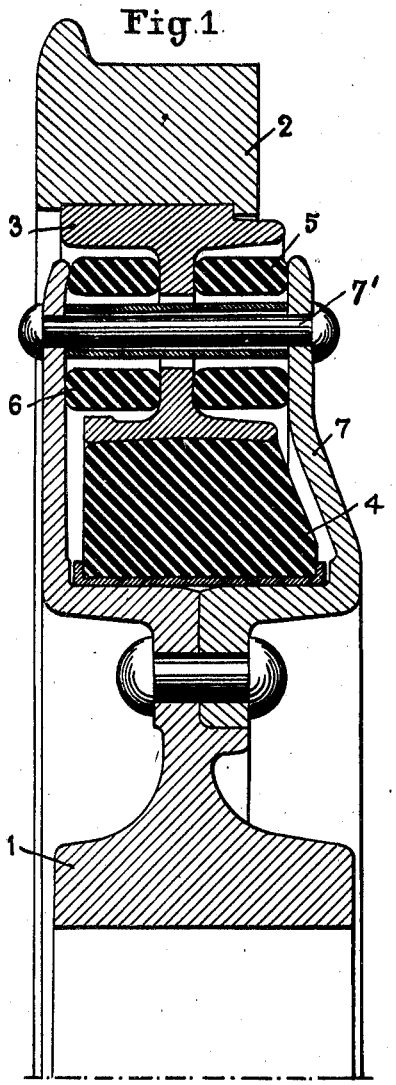
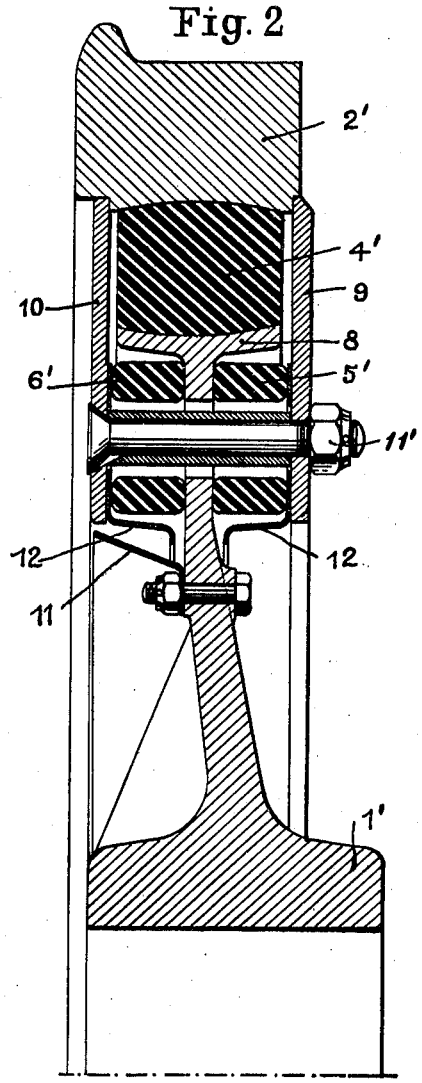
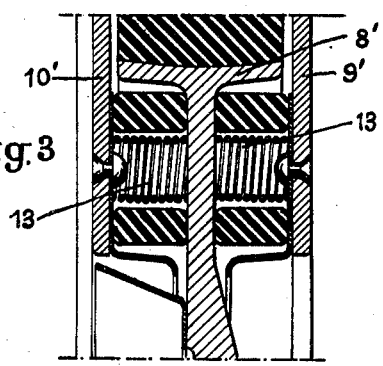
L. Bacqueyrisse
INVENTOR
By: Marks & Clerk
Attys.

Patented Aug. 27, 1935

2,012,369

UNITED STATES PATENT OFFICE 2,012,369

RESILIENT WHEEL FOR RAIL VEHICLES

Louis Bacqueyrisse, Paris, France

Application March 26, 1932, Serial No. 601,410
In France March 26, 1931

4 Claims. (Cl. 295—11)

This invention has for its object a resilient wheel for rail vehicles and the like.

It has already been proposed for road and rail vehicles, to provide said vehicles with resilient wheels characterized by the insertion between the hub and the rim of said wheel of a resilient system constituted by one or several blocks of india-rubber.

In some types of wheels now in use, said resilient system connects at the same time the rim or felloe of the wheel with the hub of said wheel, the axial connection having to damp efforts exerted in a direction parallel with the axle whilst the radial connection damps the efforts exerted in a direction at right angles with said axle.

Owing to the fact that the block or blocks of india-rubber are to be worked under compression along two perpendicular directions, it results that it is practically impossible to obtain both axial and radial satisfactory resiliency of the wheel.

In other types of wheels, the resilient system only secures the radial resiliency, the axial connection between hub and rim being effected by the contact of metallic surfaces, said surfaces having the drawback of becoming worn through friction and not allowing any axial resiliency of the wheel.

The resilient wheel according to my invention which remedies said drawbacks, comprises in combination a hub and a rim which are independent from each other and are connected with each other as well in the radial direction as in the axial or transversal direction by means of two resilient members or series of members, such as for instance blocks of india-rubber, either natural or artificial, said members being entirely separate and independent, with a view to obtain, due to the first member and only to this first one, the desired resiliency in the radial direction and, due to the second member and only to said second one, the desired resiliency in the axial direction, both values of resiliency being eventually regulated according to the needs.

In the accompanying drawing which shows by way of example two embodiments of the invention shown as resilient wheels for tram-cars:—

Fig. 1 is an axial section of the first embodiment of my invention.

Fig. 2 shows another form of construction.

Fig. 3 shows an example of the arrangement of contact springs for the return of current.

In the constructional form of Fig. 1, the wheel comprises a hub 1 conveniently secured upon an axle not shown in the drawing, and a rim or felloe 2 having a convenient shape for being guided on a rail, or for rolling upon a road.

A false rim 3 having a cross section in the shape of an I is secured to the rim 2 by any well-known means. Said means have nothing to do with my invention, so that it is quite unnecessary to describe the same.

A resilient system 4 constituted by one or several blocks of india-rubber having a convenient shape and convenient dimensions, is inserted between the base of said false rim 3 and hub 1, thus securing to the wheel a convenient resiliency in the radial direction.

Two rings of india-rubber 5 and 6, or two series of blocks of india-rubber are secured on either side of the web of said false rim 3, and are secured in their position by means of plate-like members 7 conveniently secured upon the hub, said rings 5 and 6 thus securing the desired resiliency in the axial or transverse direction.

Both groups of resilient members are independent of each other, the radial resiliency being obtained independently of the axial resiliency and vice-versa.

Blocks 4, 5 and 6 may have any desired shape, they may be either full or hollow and they may be made of any convenient resilient substance such as india-rubber, either natural or artificial, tightening devices 7' being eventually provided for regulating the compression of said resilient members in order to secure the mutual connection of rim and of hub.

In the constructional form of Fig. 2, the hub 1' is provided with a ring 8 and between said ring 8 and the rim 2' is inserted the resilient system 4' constituted by one or several blocks of india-rubber of any convenient shape and dimensions securing the desired resiliency in the radial direction.

The rings 5', 6', of india-rubber, or series of india-rubber blocks arranged on either side of the web which connects ring 8 and hub 1' are secured on their external faces by means of plate-like members 9, 10, which are conveniently mounted on the rim 2 and connected by means of any convenient tightening device 11' not shown in the drawing.

Convenient insulating covers such as 11, 12, are provided for insulating the resilient system thus constituted.

The return of current is preferably secured as shown in Fig. 3, by means of springs 13 arranged on either side of the web of ring 8' and in contact by their other side with cheeks 9' and 10'.

The invention applies to vehicle wheels of any description for rolling upon road or upon rail.

What I claim is:—

1. A resilient wheel for vehicles comprising in combination a hub member, a rim member, spaced lateral parts on one of said members, two series of resilient members, one series of resilient members being arranged radially between and in direct contact with the hub member and the rim member with a convenient clearance with the lateral parts and acting solely to independently absorb shocks radially of the wheel and being free to move in other directions, and the other series of resilient members being arranged on opposite sides of and contacting with one of said first mentioned members and contacting with the lateral parts on the other of said first mentioned members and acting solely to absorb shocks transmitted transversely to said hub and rim members and being free to move in other directions.

2. A resilient wheel as claimed in claim 1, wherein the lateral parts are in the form of annular plate-like members carried with one of the first mentioned members and acting to position the second mentioned series of resilient members, and tightening devices operably connected with the plate-like members and extending through said second series of resilient members.

3. A resilient wheel as claimed in claim 1, wherein the rim member includes a main body and a false rim I-shaped in cross section disposed on the body for coacting with the hub member for receiving the first series of resilient members and in addition contacts on its opposite sides with the adjacent ends of the second series of resilient members.

4. A resilient wheel as claimed in claim 1, wherein a ring member is provided on the hub and cooperates with the rim member in receiving the first series of resilient members and also receives the second series of resilient members on its opposite sides.

LOUIS BACQUEYRISSE.